(12) United States Patent
MacMillan

(10) Patent No.: US 8,538,601 B2
(45) Date of Patent: Sep. 17, 2013

(54) SECURITY SYSTEM

(76) Inventor: Stephen MacMillan, Malaga (AU)

( * ) Notice: Subject to any disclaimer, the term of this patent is extended or adjusted under 35 U.S.C. 154(b) by 0 days.

(21) Appl. No.: 13/548,213

(22) Filed: Jul. 13, 2012

(65) Prior Publication Data

US 2013/0018530 A1 Jan. 17, 2013

(30) Foreign Application Priority Data

Jul. 14, 2011 (AU) ................................ 2011902811

(51) Int. Cl.
*G05D 19/02* (2006.01)
*B60R 25/04* (2013.01)

(52) U.S. Cl.
USPC .......................... 701/2; 307/10.2; 340/426.13

(58) Field of Classification Search
USPC .................. 701/2, 22, 54, 110, 112, 113, 36;
307/9.1, 10.1, 10.2, 10.3, 10.4, 10.6, 10.7;
340/425.5, 426.13, 426.16, 428, 429, 902;
123/478; 180/287; 903/903
See application file for complete search history.

(56) References Cited

U.S. PATENT DOCUMENTS

| | | | |
|---|---|---|---|
| 4,535,863 A | 8/1985 | Becker | |
| 4,553,127 A | 11/1985 | Issa | |
| 5,307,048 A * | 4/1994 | Sonders | 340/426.12 |
| 5,977,654 A | 11/1999 | Johnson et al. | |
| 6,091,340 A * | 7/2000 | Lee et al. | 340/5.6 |
| 6,629,050 B2 * | 9/2003 | Modgil | 702/73 |
| 7,834,583 B2 * | 11/2010 | Elder et al. | 320/104 |
| 2002/0116117 A1 * | 8/2002 | Martens et al. | 701/115 |
| 2005/0190080 A1 * | 9/2005 | Flick | 340/989 |
| 2011/0047052 A1 * | 2/2011 | Cornish | 705/30 |
| 2012/0226410 A1 * | 9/2012 | Snider | 701/36 |

FOREIGN PATENT DOCUMENTS

| | | | |
|---|---|---|---|
| JP | 2003059483 A | * | 2/2003 |
| WO | 2004/074042 A2 | | 9/2004 |

OTHER PUBLICATIONS

International Search Report mailed Oct. 4, 2012 for PCT/AU2012/000839.

* cited by examiner

*Primary Examiner* — Mary Cheung
*Assistant Examiner* — Rodney Butler
(74) *Attorney, Agent, or Firm* — Cascio & Zervas

(57) ABSTRACT

A vehicle security system including a remote control device, such as a keypad and a vehicle battery having a controller arranged to reduce battery power when the vehicle engine is turned off, and arranged to receive a unique code transmitted from the remote control device and to subsequently selectively permit the battery to supply sufficient power to start or drive the vehicle. The battery can be a replacement battery for the vehicle or supplied as an OEM part. The battery controller can be provided with a unique serial number to be directly linked to the vehicle. Authorities can be provided with a control codes that can be transmitted remotely from a police pursuit vehicle to selectively absorb the external power from the vehicle electrical systems and remotely stop the engine in the event of a stolen or misused vehicle.

21 Claims, 2 Drawing Sheets

SECURITY SYSTEM

FIELD OF THE INVENTION

The present invention relates to a security system, such as for preventing unauthorised starting or use of a vehicle.

BACKGROUND TO THE INVENTION

The risk of unauthorised taking or use of a vehicle is sufficient to encourage most vehicle owners or manufacturers to install a security system on a vehicle. Those security systems either prevent starting of the vehicle (i.e. a vehicle immobiliser) or set off an audible alarm, or both.

Such security systems, even as after market 'retrofit' systems, typically require specialist knowledge and installation to connect into the vehicle's electrical wiring system. This increases cost to the owner or authorised user of the vehicle, and, in the case of an aftermarket system, requires the vehicle to be left with a specialist installer for a period of time, which is inconvenient to the vehicle owner.

Also, when replacing a security system on a vehicle, including OEM and aftermarket systems, such as when a 'superior' vehicle security system upgrades or supersedes an old one or the original system has failed, there are wiring changes and component mounting amendments that are an inconvenience causing OEM production line changes for OEM installations and complications and time delays for aftermarket installations.

Most vehicle security systems (except high end GPS systems) have no defence after theft has occurred, most commonly by use of keys/remote control by unauthorised users.

With the aforementioned in mind, it is desirable to provide a security system that does not require specialist installation or additional wiring, and which will either prevent unauthorised starting of a vehicle or prevent continued unauthorised use of a vehicle.

SUMMARY OF THE INVENTION

Most vehicles nowadays include one or more batteries to start an engine and maintain an engine running, or to power one or more electric motors. Power to start the engine or allow the vehicle to move under its own power is generally initiated through an 'ignition' system requiring one or more physical or remote 'keys' to operate the vehicle.

The present invention relates to a vehicle security system associated with a vehicle's battery and requires no additional installation wiring except the replacement of the previous conventional battery.

The present invention may include a controller component mounted within a casing of the battery or mounted externally of the battery. The controller may therefore be provided in a housing at least part by part of the battery casing or may be in a housing externally mounted to the battery and electrically connected to the positive and negative terminals of the battery.

Furthermore, the vehicle cannot be stolen even when keys and ignition or alarm remote controls, or even the remote control device of the present invention, are stolen because the person stealing them does not know the unique user code to initiate the controller and allow power to start or move the vehicle.

With the aforementioned in view, in one aspect the present invention provides a vehicle security system including a vehicle battery having a controller, the controller operable by a remote control device, the controller arranged to selectively permit the battery to supply full power or part power for electrical systems of the vehicle.

Optionally the present invention may include a power absorption function to the battery. This function is termed herein a 'negative power' or 'power absorption' function. This occurs when the positive battery terminal is momentarily and repetitively 'shorted' (preferably internally of the battery) to the negative terminal. This causes the external power supply (e.g. the alternator), which is connected to the positive battery terminal, to malfunction because it cannot sustain its self-sustaining generator field. Because this is momentary, it does not affect vehicle fuses as the collapsing field cannot generate high output currents.

In this power absorption function, preferably the battery terminals only become isolated when one or more resettable fuses or automatic cut-out switches are triggered by over-current. This is a safety feature. If someone was to tamper with the battery incorporating the controller component of the present invention, such as by putting a spanner across the battery terminals when the system is in 'standby mode', then instead of destruction of components or a fire, the resettable (e.g. polyswitch) fuses open and only reset after the short circuit has been removed.

Also during unauthorised attempted 'jump starting', the system will attempt to absorb the external electrical power which of course it cannot, the resettable fuses will 'open' and engine will start. However, once the external power source is removed (i.e. jump leads), the resettable fuses reset, the alternator field collapses and engine is stopped.

A further aspect of the present invention provides a vehicle security system including a remote control device and a vehicle battery having a controller, the controller arranged to reduce battery power available to the vehicle's electrical systems after a period of time (for example, 30 seconds after the vehicle engine is turned off), and the controller arranged to receive a unique code transmitted from the remote control device and to subsequently selectively permit the battery to supply sufficient power to start or drive the vehicle.

An alternative aspect of the present invention provides a vehicle security system including a remote control device and a vehicle battery having a controller, the controller arranged to reduce battery power when the vehicle main propulsion means is turned off, and the controller arranged to receive a unique code transmitted from the remote control device and to subsequently selectively permit the battery to supply sufficient power to start the engine or engage the main propulsion means to drive the vehicle.

Part power may include standby power, accessories power, power for lighting etc, but not power to start an engine of the vehicle or to engage the main propulsion means to drive the vehicle under its own power.

Preferably the security system of the present invention may include the controller integrated within a housing or casing of the battery. Thus the security system of the present invention may be provided as a replacement or original appearing vehicle battery with the addition of a remote control device.

The remote control device may comprise a keypad, such as a numeric or alphanumeric keypad. Alternatively, the remote control device may be hard wired to the electrical system of the vehicle (especially in OEM installations) and send the correct unique code to the battery through the connected electrical system.

The security system of the present invention may include the controller selectively permitting a positive battery terminal, negative battery terminal, or both, electrical connection to electrical systems of the vehicle.

The controller may include vehicle motion and/or vibration monitoring or detection. Vibration or motion, or both, may be used by the controller to determine whether the battery output power should change or not.

The controller may include alternator current or voltage monitoring or detection. Alternator current, voltage or both, may be used by the controller to determine whether the battery output power should change or not.

The controller may control positive battery terminal power based on received input from the correct remote control device or a control signal from an authorised agent, such as an authorised law enforcement agency e.g. police.

One or more embodiments of the system of the present invention do not require additional external wiring or connection to the vehicle beyond the standard battery connection provided for connection to a standard or recommended battery for that vehicle. Thus, a battery of the present invention incorporating the controller can directly replace a standard or recommended battery for that vehicle without requiring additional external wiring, connections or specialist installation.

In use, when the positive and negative terminals of the battery of the present invention are connected to the positive and negative electrical connections on the vehicle, an authorised code must be entered via the remote control device which then sends an activation signal to the controller of the battery to allow the vehicle engine to be started or the vehicle to be operated under its own power.

The system of the present invention may include a unique user code to permit the controller to allow full power to start an engine of the vehicle or allow the vehicle to move under its own power. The unique user code may be a numeric, alphanumeric personal identification number (PIN number).

According to one or more embodiments of the present invention, the controller may allow standby power or vehicle accessories and/or lighting and/or horn if the remote control device has not been operated and the engine is switched off or drive power disconnected. Thus, with the vehicle stationary and the engine switched off, the accessories and/or lighting are still available. This is particularly useful for safety reasons, particularly if the vehicle is stationary at night or in poor lighting or weather conditions. Such an arrangement also allows the central locking system to remain operative for personal security within a vehicle such as a car.

It will be appreciated that the present invention is particularly applicable to cars/automobiles; however, other vehicles fall within the scope of applicability of the present invention. For example, vehicles that have engines started by battery or are battery powered (so called electric vehicles) fall within the scope of the present invention. Specific examples include motorcycles, electric scooters, personal watercraft (jet-skis, jet-bikes etc), boats, trucks, military vehicles, commercial and industrial vehicles, aircraft etc.

Preferably, full power at the positive battery terminal for starting or otherwise operating the vehicle may only be available by first inputting the correct unique code into the remote control device and transmitting a signal to the controller to effect selective control of battery power, thereby permitting the controller to electrically connect the positive terminal directly to the battery cells.

According to one or more embodiments of the present invention, only when both vehicle vibration/motion and alternator output voltage/current have ceased does the controller disconnect full power between the battery cells and the positive battery terminal. Thus, the system can automatically revert to standby power only by allowing some of the cells to remain connected to the positive terminal or the controller includes a voltage/current step down or reduction means whereby all of the battery cells remain electrically connected to the positive terminal but full power output sufficient to start an engine or provide significant propulsion power is not available.

Preferably, the system is arranged such that unauthorised jump starting or push starting of the vehicle would result in power absorption at the positive battery terminal which would collapse the alternator field and stop the vehicle engine.

Should the unique code (e.g. personal identification number—PIN) and vehicle fall into unauthorised hands such that the vehicle is subsequently stolen, and an alert to authorities (such as the police) or pursuit of said stolen vehicle ensues, the relevant authority is able to transmit a unique remote deactivation code by cross matching the vehicle or vehicle identification (such as a licence plate number or vehicle registration number) to a unique battery identification code (such as a battery serial number). Such a unique transmission code will disable the stolen vehicle by reverting the battery to negative power output or power absorption state.

It is a preferred embodiment of the present invention that an audible device is fitted on or within the battery as an audible reminder for a vehicle operator to input the unique code (e.g. the PIN) into the remote control device before attempting to start the engine or move the vehicle.

A further preferred embodiment provides an audible reminder from the remote control device (such as a keypad) inside the vehicle cabin, as it may be easier to hear in the cabin when there is external noise, such as traffic, construction work, railway or aircraft movements, near to the vehicle. The remote control device may include movement detection means and audible alert means that operates when such movement or noise is detected. An audible or visual device may be provided within or on the vehicle (such as a device inserted into a vehicle cigarette lighter socket or a USB socket as an audible and/or visual reminder for driver to input the unique code into the remote control device before attempting to start the engine or move the vehicle.

It is a preferred embodiment of the present invention that a locking mechanism be attached onto one or both battery output terminals or to or in addition to the battery casing to inhibit unauthorised removal or tampering of the battery from the vehicle.

One or more resettable fuses or switches may be provided as part of or electrically connected to the controller to activate in the event of excessive power surges from damaging the controller and/or battery.

To assist with understanding the invention reference will now be made to the accompanying drawings which show examples of the invention.

DESCRIPTION OF PREFERRED EMBODIMENT

Figure 1:
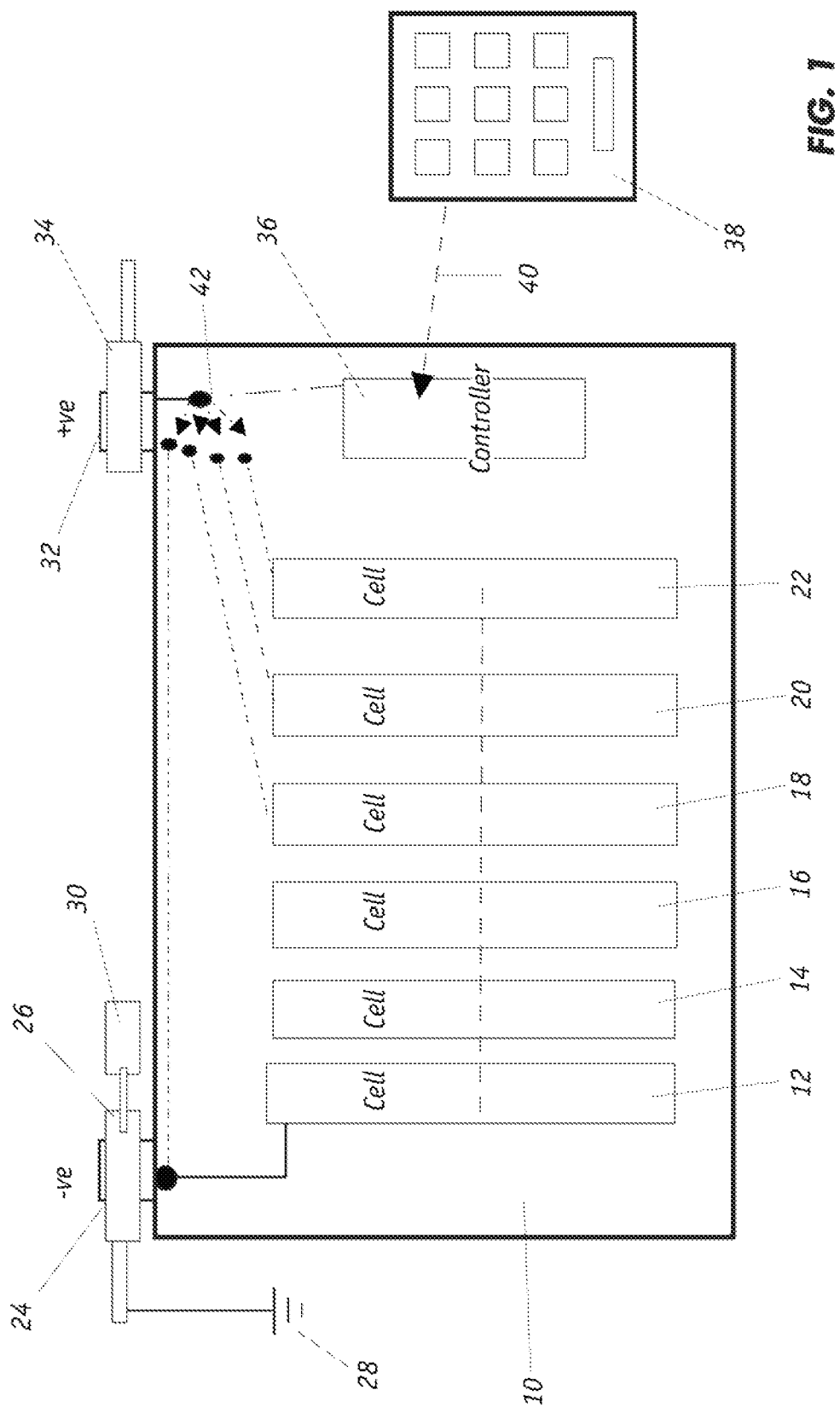
FIG. 1 shows a vehicle security system according to an embodiment of the present invention.

FIG. 1 shows an embodiment of the present invention in the form of a vehicle battery 10 (such as a car battery) and corresponding remote control 38. By way of example, the vehicle can be a typical petrol or diesel engined car. A locking mechanism 30 is attached to negative battery terminal 24. The locking mechanism 30 may alternatively be attached to the positive battery terminal 32 or to both positive and negative battery output terminals.

The battery 10 includes multiple cells or plates 12-22. In this embodiment each cell or plate corresponds to 2 volts for a 12 volt battery. A Negative battery terminal 24 is connected to a battery connector 26 connected to earth 28 on the vehicle chassis or body (not shown).

The battery houses a controller 36 which receives communication from the remote control device 38. Communication may be wireless, preferably by radio frequency (RF) or blue tooth, wifi, mobile phone or via hard wiring into the electrical system by OEMs in new vehicles.

The controller is operatively connected to a switch means 42. The controller determines which of the battery cells/plates the positive terminal 32 connects to, or available output current, and thereby how much power the battery can deliver to electrical systems of the vehicle via the positive terminal connection 34.

The remote control device 38 is preferably in the form of a keypad with numeric number entry buttons. Alternatively, or in addition, one or more unique personal identification means may be provided to detect one or more personal features of an authorised person permitted to drive the vehicle. These personal features may include one or more of fingerprint, iris, retina or facial feature identification. Recognition of authorised personal features may be transmitted to the controller as authorisation to enable full battery power. Such transmission may be provided by the remote control device or may be provided in addition to the unique code from the remote control device as additional security.

The keypad is initially supplied with a common four-eight digit PIN code (such as 0000). This is personalised by a particular user to a unique code by inputting code 0000 three times followed by the new PIN code three times, e.g. 0000 . . . 0000 . . . 0000 . . . 2468 . . . 2468 . . . 2468, which results in the new PIN being registered in the keypad as PIN 2468.

The remote control keypad can be supplied with self-adhesive backing, allowing it to be mounted in a convenient position in the car. For example, the keypad can be mounted on the inside of the driver's sun visor.

To start the car the driver inserts the ignition key and dimmed indicator lights alight on the dash. At this point the battery is only supplying limited power for accessories, lights etc, and not sufficient to start the car. The driver then enters the unique PIN code into the keypad. The keypad transmits 40 a code to the controller within or on the battery. Preferably the keypad has lights that immediately dim and a transmit indicator illuminates momentarily.

The controller 36 receives the transmitted signal and causes the positive output terminal to be supplied with full power from the battery. Preferably, the dimmed indicator lights on dash now brighten as full battery power is made available. The petrol or diesel engine will now start as normal, or an electric vehicle will have sufficient battery power to move under its own power.

For a diesel or petrol engined vehicle, the engine will remain running until both vibration from the engine and alternator voltage cease and (preferably 30 seconds later or some other pre-determined delay time) the controller reverts the battery to standby power to await entry again of the correct unique code relating to as full power request again.

In the case where an unauthorised driver attempts to start or drive away the car without the relevant PIN number, the dashboard lights will remain dim and the starter motor and/or starter solenoid will not operate. For example, control of the battery output can be such that there is not sufficient power to throw the starter solenoid or to cause the starter motor to crank the engine over.

When the battery is installed in the car, the purchaser registers the battery serial number with the car identification/registration number. This may be done via a website database or through the battery supplier. For example, a battery retailer may have access to a battery registration process whereby the new battery, when purchased, is then registered to that owner or the vehicle.

Authorities may have access to such records, whereby, if the vehicle is used in an unauthorised manner, they have the ability to immobilise the vehicle, such as during a car chase or when the stolen vehicle is located. In the event of a car located during a car chase, the authority, such as the police, can transmit a disable code to the vehicle. The controller within the battery detects the unique authority code and the positive output terminal becomes an intermittent power sink, collapsing the alternator field until the vehicle electrical system is disabled and engine is stopped.

When an authority code is used to disable the vehicle electrical system, this can be done gradually in order to allow the vehicle to slow down rather than immediately lose electrical battery and alternator supply completely. This provides an additional safety feature.

Unauthorised jump starting or push starting initiates negative power output 62 and external power absorption at the positive battery terminal 64 which would collapse the alternator field and stop the vehicle engine once the jump leads have been removed.

Figure 2:
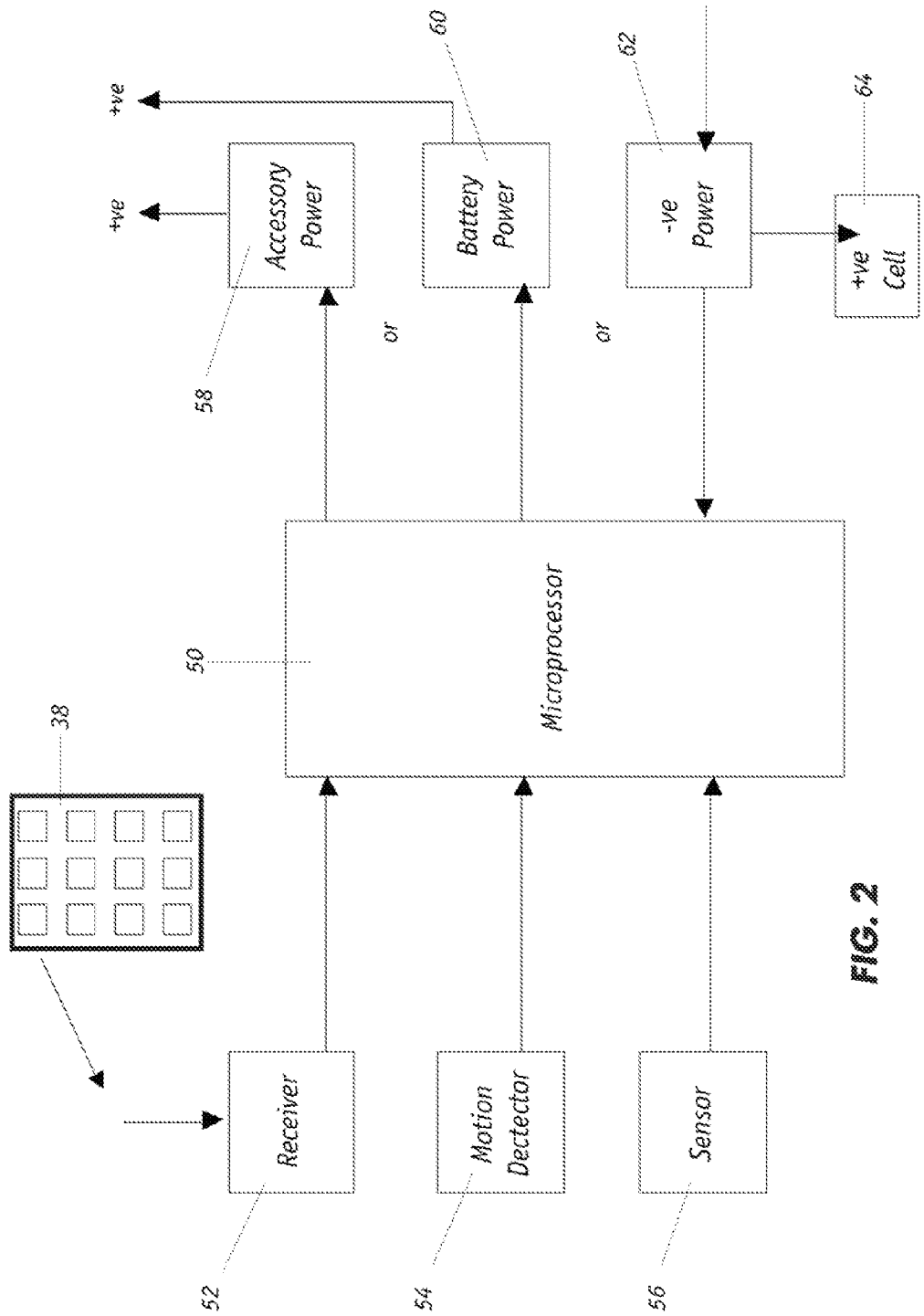
FIG. 2 shows internal logic flow within an embodiment of the present invention.

FIG. 2 shows the logic used by the system. The system includes a microprocessor 50 which receives inputs from a receiver 52. The receiver receives a unique code from the remote control device 38. The unique code is generated by the remote control device once the correct PIN is entered by the authorised user. Preferably the remote control device and the receiver communicate via UHF.

One or more vibration and/or motion detection means 54 provide input to the microprocessor 50.

Also, a voltage and/or current sensor 56 provides input to the microprocessor. This detects whether or not the alternator is outputting voltage/current to the battery to help indicate whether the engine is operating or not.

If no valid unique code has been received by the receiver, and the engine is switched off, the microprocessor will only allow connection of enough battery cells or enough voltage/current from more cells to provide accessory power 58 to the positive terminal.

If a valid unique code is received from the remote control device, the positive terminal is provided with enough battery power 60 for starting the engine or for motion on an electric vehicle.

In the negative power function 62, the positive output terminal of the battery 64 is intermittently disconnected from the battery's internal positive supply and internally connected to the internal negative supply instead. When this happens, any external electrical supply (such as from an alternator) is intermittently shorted. In the case of the external alternator supply, this collapses the self-sustaining alternator field, a little at first, then increasing the length of the repeating shorts until the engine slows down and stops.

The invention claimed is:

1. A vehicle security system including a remote control device and a vehicle battery with a controller, the controller arranged to partially reduce battery power when the vehicle engine or main propulsion power source is turned off, and the controller arranged to receive a unique code transmitted from the remote control device and to subsequently selectively permit the battery to supply sufficient power to start the engine or engage the main propulsion power source to drive the vehicle with the controller limiting the battery to supply part power prior to receiving the unique code from the remote control device, the part power not being sufficient to start the engine or enable the main propulsion power source for driving the vehicle.

2. The system according to claim 1, wherein the part power enables use of accessories and lighting.

3. The system according to claim 1, wherein the controller is integrated within or on an outer housing or casing of the battery, or connecting to positive and negative terminals of the battery and incorporating alternative battery terminals for replacement connection to the vehicle's electrical system.

4. The system according to claim 1, wherein the remote control device includes a keypad to input a personal identification code (PIN) into the remote control device.

5. The system according to claim 1, further comprising one or more unique personal identifiers to detect one or more unique personal features of an authorised person permitted to drive the vehicle.

6. The system according to claim 5, wherein the one or more unique personal features is selected from the group consisting of fingerprint, iris, retina, and facial feature identification.

7. The system according to claim 1, wherein the controller selectively connects a positive battery connection to electrical systems of the vehicle.

8. The system according to claim 1, further comprising vehicle motion and/or vibration monitoring or detection sensor.

9. The system according to claim 8, wherein an output of the vehicle motion and/or vibration monitoring or detection sensor is used by the controller to determine whether the battery supply should maintain partial or full power to the vehicle electrical systems.

10. The system according to claim 1, further comprising alternator current and/or voltage monitoring or detection sensor.

11. The system according to claim 10, wherein an output of the alternator current and/or voltage monitoring or detection sensor is used by the controller to determine whether the battery supply should maintain partial or full power to the vehicle electrical systems.

12. The system according to claim 1, wherein the controller controls positive battery terminal voltage based on received input from the remote control device or a control signal from an authorised agent.

13. The system according to claim 12, wherein the authorised agent is a law enforcement agency.

14. The system according to claim 1, wherein the vehicle is a road or off-road wheeled electrically powered or petrol or diesel engined vehicle, a powered boat or other powered watercraft, or a powered aircraft.

15. A vehicle security system including a remote control device and a vehicle battery with a controller, the controller arranged to partially reduce battery power when the vehicle engine or main propulsion power source is turned off, and the controller arranged to receive a unique code transmitted from the remote control device and to subsequently selectively permit the battery to supply sufficient power to start the engine or engage the main propulsion power source to drive the vehicle wherein the system is arranged such that detection of unauthorised jump starting or push starting of the vehicle by the controller causes the controller to effect battery power output reversal at a positive battery terminal to collapse an electrical field of an alternator on the vehicle and stop the vehicle engine.

16. The system according to claim 1, wherein the controller is arranged to receive a unique remote deactivation code, the unique remote deactivation code determined by cross matching the vehicle or vehicle identification to a unique battery identification.

17. A vehicle security system including a remote control device and a vehicle battery with a controller, the controller arranged to partially reduce battery power when the vehicle engine or main propulsion power source is turned off, and the controller arranged to receive a unique code transmitted from the remote control device and to subsequently selectively permit the battery to supply sufficient power to start the engine or engage the main propulsion power source to drive the vehicle wherein the controller is arranged to receive a unique remote deactivation code, the unique remote deactivation code determined by cross matching the vehicle or vehicle identification to a unique battery identification and wherein the unique remote deactivation code disables the vehicle by reverting the battery to a reverse power output or power absorption state.

18. The system according to claim 1, wherein an audible alert device associated with the battery as an audible reminder for a vehicle operator to input the unique code into the remote control device before attempting to start the engine or move the vehicle.

19. The system according to claim 1, wherein a locking mechanism is provided for one or both of a positive and a negative battery terminal and/or a battery casing to inhibit unauthorised removal or tampering of the battery from the vehicle.

20. A vehicle security system including a remote control device and a vehicle battery with a controller, the controller arranged to reduce battery power when the vehicle engine or main propulsion power source is turned off, and the controller arranged to receive a unique code transmitted from the remote control device and to subsequently selectively permit the battery to supply sufficient power to start the engine or engage the main propulsion power source to drive the vehicle wherein the system is arranged such that detection of unauthorised jump starting or push starting of the vehicle by the controller causes the controller to effect battery power output reversal at a positive battery terminal to collapse an electrical field of an alternator on the vehicle and stop the vehicle engine.

21. A vehicle security system including a remote control device and a vehicle battery with a controller, the controller arranged to reduce battery power when the vehicle engine or main propulsion power source is turned off, and the controller arranged to receive a unique code transmitted from the remote control device and to subsequently selectively permit the battery to supply sufficient power to start the engine or engage the main propulsion power source to drive the vehicle wherein the controller is arranged to receive a unique remote deactivation code, the unique remote deactivation code determined by cross matching the vehicle or vehicle identification to a unique battery identification and wherein the unique remote deactivation code disables the vehicle by reverting the battery to a reverse power output or power absorption state.

* * * * *